(12) United States Patent
Gertz

(10) Patent No.: US 6,236,435 B1
(45) Date of Patent: May 22, 2001

(54) APPARATUS AND METHOD FOR DISPLAYING AND DEMONSTRATING A CAMCORDER

(75) Inventor: Jonathan Gertz, Lexington, KY (US)

(73) Assignee: Audio Authority Corporation, Lexington, KY (US)

( * ) Notice: Subject to any disclaimer, the term of this patent is extended or adjusted under 35 U.S.C. 154(b) by 0 days.

(21) Appl. No.: 09/003,534

(22) Filed: Jan. 6, 1998

(51) Int. Cl.[7] .......................... H04N 5/225; H04N 5/222
(52) U.S. Cl. .................... 348/373; 348/376; 348/333.01; 348/333.06
(58) Field of Search ..................... 348/211, 373, 348/375, 376, 207, 333; 340/568.2

(56) References Cited

U.S. PATENT DOCUMENTS

| | | | |
|---|---|---|---|
| 4,167,022 | * 9/1979 | Dischert et al. | 348/211 |
| 4,772,878 | 9/1988 | Kane . | |
| 5,072,213 | 12/1991 | Close . | |
| 5,124,685 | * 6/1992 | Rankin | 340/568.2 |
| 5,146,205 | 9/1992 | Keifer et al. . | |
| 5,172,098 | 12/1992 | Leyden et al. . | |
| 5,264,929 | * 11/1993 | Yamaguchi | 348/159 |
| 5,305,100 | * 4/1994 | Choi | 348/211 |
| 5,335,014 | * 8/1994 | Elberbaum | 348/211 |
| 5,341,124 | * 8/1994 | Leyden et al. | 340/568.2 |
| 5,610,587 | * 3/1997 | Fujiuchi et al. | 340/568.2 |
| 5,646,602 | 7/1997 | Gertz et al. . | |
| 5,671,012 | * 9/1997 | Oyashiki et al. | 348/211 |
| 5,861,807 | * 1/1999 | Leyden et al. | 340/568.2 |

* cited by examiner

Primary Examiner—Wendy R. Garber
Assistant Examiner—Jacqueline Wilson
(74) Attorney, Agent, or Firm—King and Schickli, PLLC

(57) ABSTRACT

An apparatus is provided for displaying and demonstrating a camcorder. The apparatus includes a holder for receiving and holding the camcorder and a display monitor for demonstrating camcorder performance. Additionally, the apparatus includes a detector for detecting displacement of a camcorder from a holder and a controller for operatively connecting the camcorder to the display monitor upon detecting displacement of the camcorder. The method for displaying and demonstrating a camcorder includes the steps of providing a holder for each camcorder on display, detecting displacement of any camcorder from any holder and connecting any camcorder displaced from any holder to a monitor in order to demonstrate the camcorder.

7 Claims, 4 Drawing Sheets

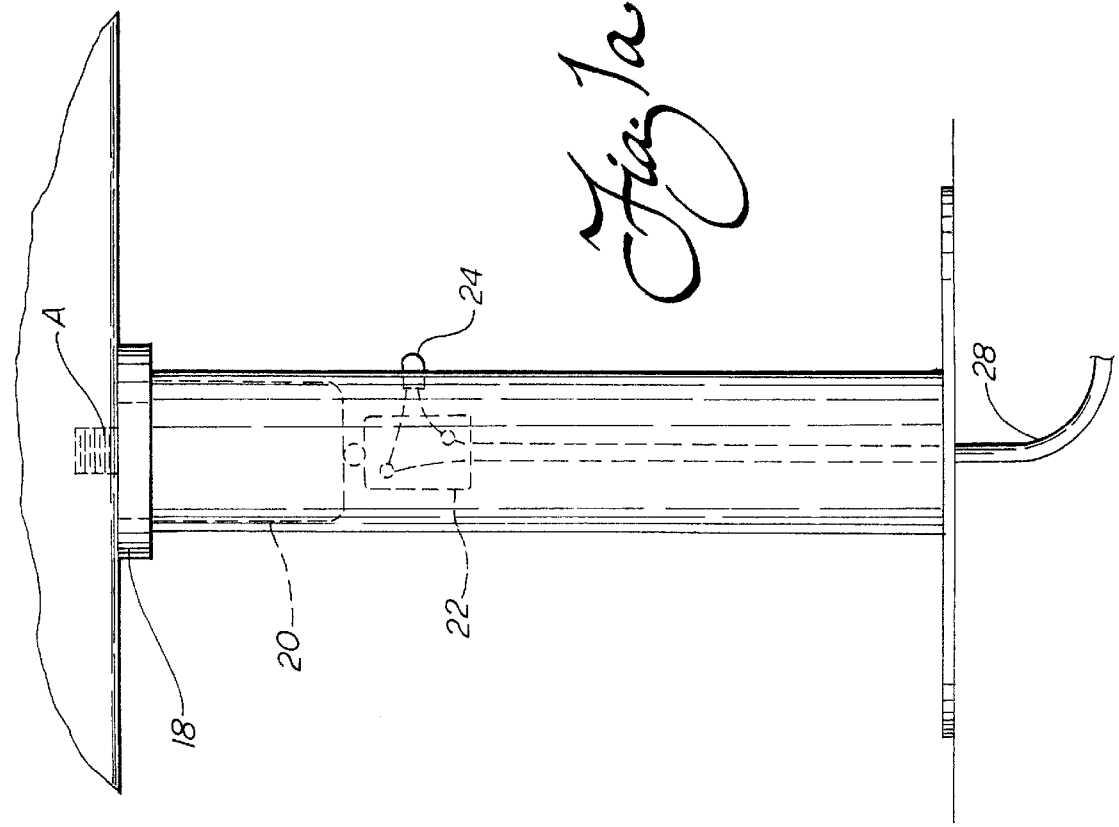
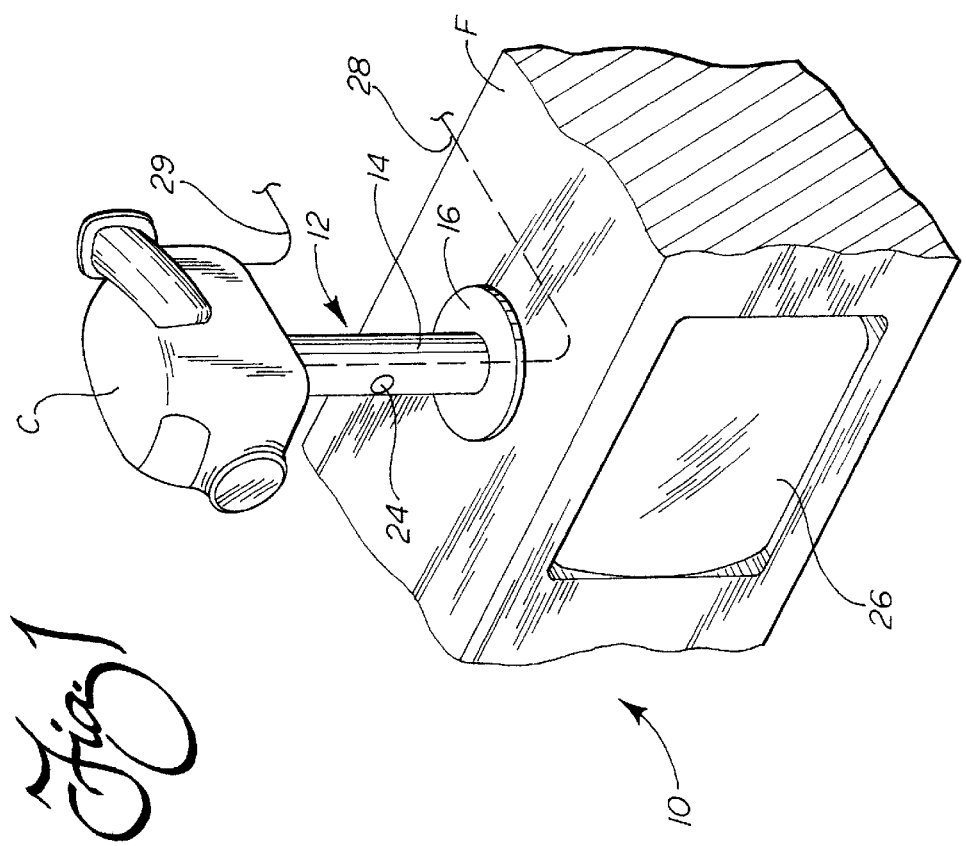

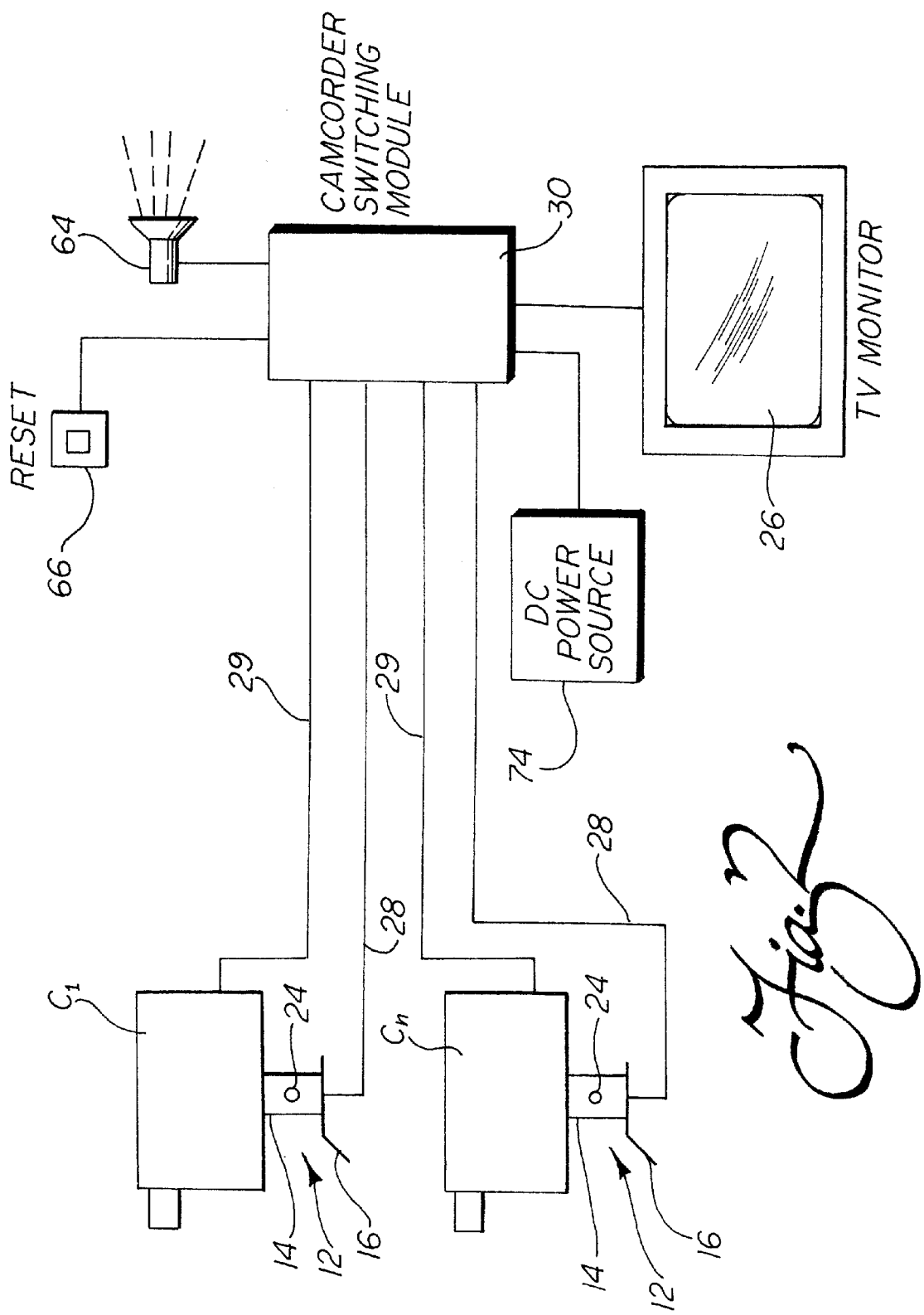

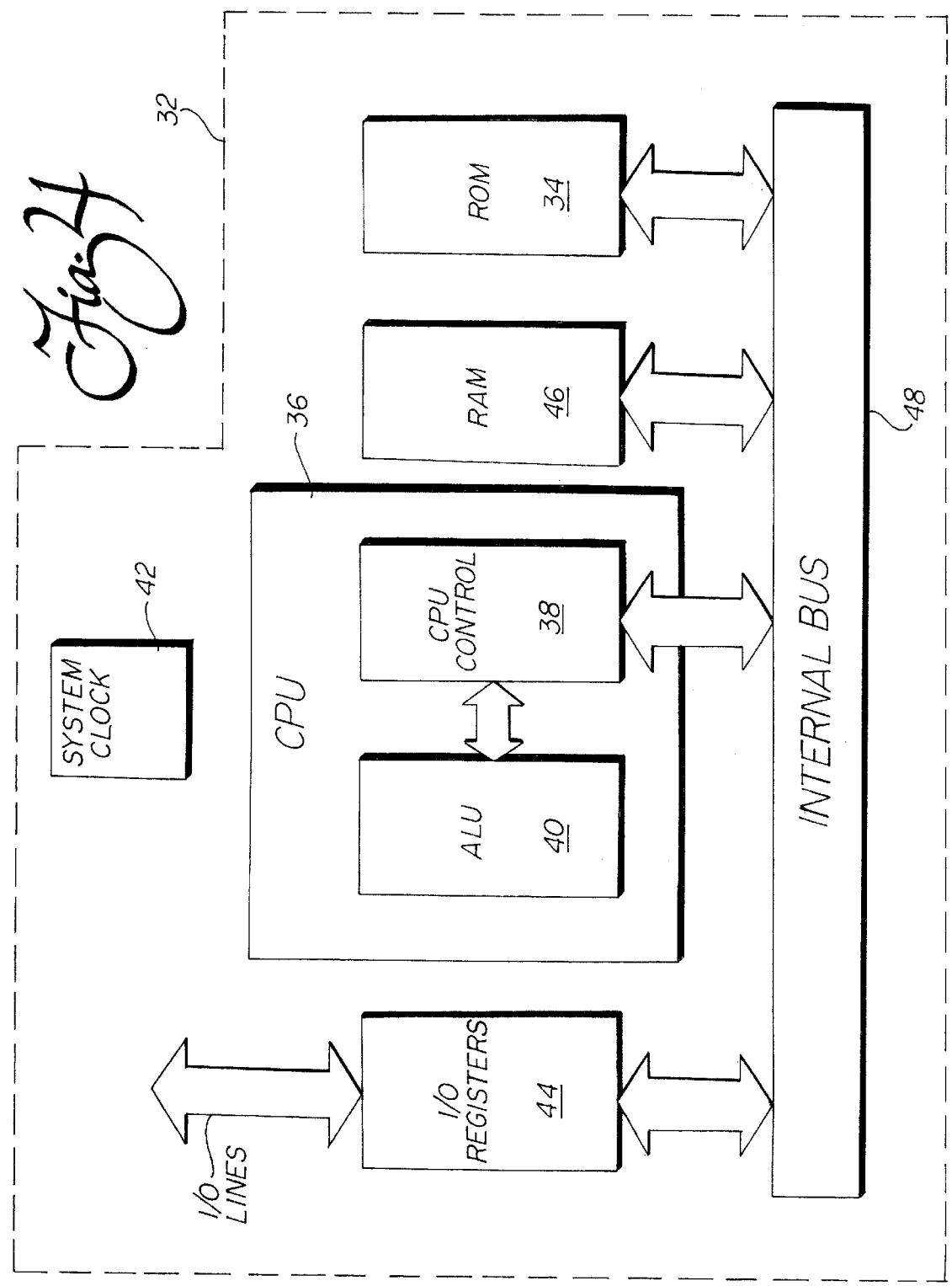

APPARATUS AND METHOD FOR DISPLAYING AND DEMONSTRATING A CAMCORDER

TECHNICAL FIELD

The present invention relates generally to retail selling of consumer electronics and, more particularly, to an apparatus and method for displaying and actively demonstrating the operating features and performance qualities and characteristics of a camcorder.

BACKGROUND OF THE INVENTION

Retailers largely rely upon active demonstrations to present electronic consumer products and, particularly, audio and video entertainment products to customers. Such active demonstrations allow the customers to explore product features, directly compare products and match customer needs and desires with the available products. Accordingly, active demonstrations are very effective in facilitating sales of consumer electronic products.

It is also clear that any system for actively demonstrating consumer electronic products must also protect those products from theft. Further, such a system should be as vandalism proof as possible. These additional considerations cannot be simply ignored in today's cultural environment.

The present invention relates to the display and demonstration of camcorders. The camcorder has evolved into the product of choice for consumers wishing to record live picture with sound. The range of technical features now available in camcorders demands that the shopper be free to handle them in order to evaluate picture qualities such as detail and color rendition, screen stabilization performance, ease-of-use features such as focus and zoom and aesthetic values including weight. Further, since the trend in retailing is away from skilled sales staff and towards self-service, it is left up to the consumer to demonstrate electronic goods themselves. Accordingly, simplified display function is an essential element of any good demonstration and display system.

In order to provide the capability to demonstrate such a wide range of camcorder features, the present invention provides a convenient support for displaying the camcorder in the manner similar to that disclosed in U.S. Pat. No. 5,146,205 to Keifer et al. More specifically, an upright cylindrical column is mounted to a base plate that is anchored or otherwise secured to a display fixture. A pin is secured to the base of the camcorder. The pin is removably held in the column so that the camcorder is conveniently displayed and also may be lifted from the column for inspection and demonstration of features.

While the display column disclosed in the Keifer et al. patent is quite effective, it does suffer from several shortcomings. First and foremost, the Keifer et al. display system fails to provide for automatic demonstration of the camcorder as it is lifted from the stand by the consumer. This is a particularly important feature in today's self-service retail environment. Second, the Keifer et al. display system utilizes a cumbersome product security system including separate mechanical and electronic security cables. This is a relatively cumbersome system that requires some extra time to install and can make consumer handling of the camcorder awkward and inconvenient. This latter problem is of particular concern since it discourages the customer from fully investigating the product thereby interfering with a potential sale.

SUMMARY OF THE INVENTION

Accordingly, it is a primary object of the present invention to provide an apparatus and method for demonstrating a camcorder overcoming the above described limitations and disadvantages of the prior art.

Another object of the present invention is to provide an apparatus and method for conveniently displaying and automatically demonstrating camcorder performance when the camcorder is lifted by a customer from the display stand for inspection. Specifically, the video output of the camcorder is automatically connected to a nearby monitor in order to display the picture being picked up by the camcorder. In this way, the retailer may share costly and spaced-consuming television monitors among two or more camcorders while freeing the shopper from the burden of (1) learning that the camcorder of interest must be manually selected to get the picture up on the monitor and (2) finding and operating the switch that enables the selection. Additionally, since the manual selector switch is often the target of vandalism, the elimination of a manual selector switch is a very significant advantage provided by the present invention.

Still another object of the present invention is to provide a camcorder display and demonstration system that provides a looped current through the conventional stereo patch cord utilized to connect the camcorder's audio and video jacks to a playback monitor. When the continuity of the camcorder loop is broken by the cutting or disconnection of the patch cord, the resulting voltage increase between the audio and video jacks results in the triggering of a theft alarm. Advantageously, this eliminates the need for separate security cables which may be found cumbersome and inconvenient when a consumer handles and inspects a camcorder.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a new and improved apparatus and method for displaying and demonstrating a camcorder is provided. The apparatus comprises a holder for receiving and holding a camcorder and its display monitor for demonstrating camcorder performance. Further, the apparatus includes a detector for detecting displacement of the camcorder from the holder as well as a controller for operatively connecting the camcorder to the display monitor upon detecting displacement of the camcorder. Thus, it should be appreciate that when the camcorder is handled by a customer and removed from the display stand for inspection, a nearby monitor automatically begins demonstrating performance of the camcorder without delay or any further action on the part of the customer. This is the most convenient and effective demonstration network that may be developed for the display and demonstration of camcorder performance.

Still further, the apparatus includes an effective security feature. Specifically, a patch cord is provided for delivering audio and video signals from the camcorder to the controller which serves to route those signals to the television monitor at the time the camcorder is being inspected by a consumer. The controller also includes a means for generating a loop current in the patch cord at all times and a security alarm. Any interruption in the loop current caused by disconnection or cutting of the patch cord causes the alarm to be activated. Accordingly, an efficient security system for deterring theft is provided without the need for separate mechanical or electronic security cables as utilized in typical prior art designs.

In accordance with yet another aspect of the present invention, a novel and effective method for displaying and demonstrating a camcorder is provided. The method includes the steps of providing a holder for each camcorder on display, detecting displacement of any camcorder from its holder and connecting any camcorder displaced from any holder to a monitor in order to demonstrate the camcorder. This simple and straightforward method provides a more efficient and consumer friendly approach for demonstrating the performance features of a camcorder. This represents a significant advantage in today's self-service retail environment that promotes sales to the advantage of the retailer.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a perspective view of a camcorder positioned on the holder of the present invention as it would be displayed to the consumer or customer;

FIG. 1a is a detailed side elevational view showing the camcorder held on the holder and the detector for detecting displacement of the camcorder from the holder;

FIG. 2 is a simplified overview block diagram of the camcorder display and demonstration apparatus of the present invention;

FIG. 4 is a simplified block diagram detailing the microcontroller of the connecting means/controller shown in FIG. 3.

Figure 3:
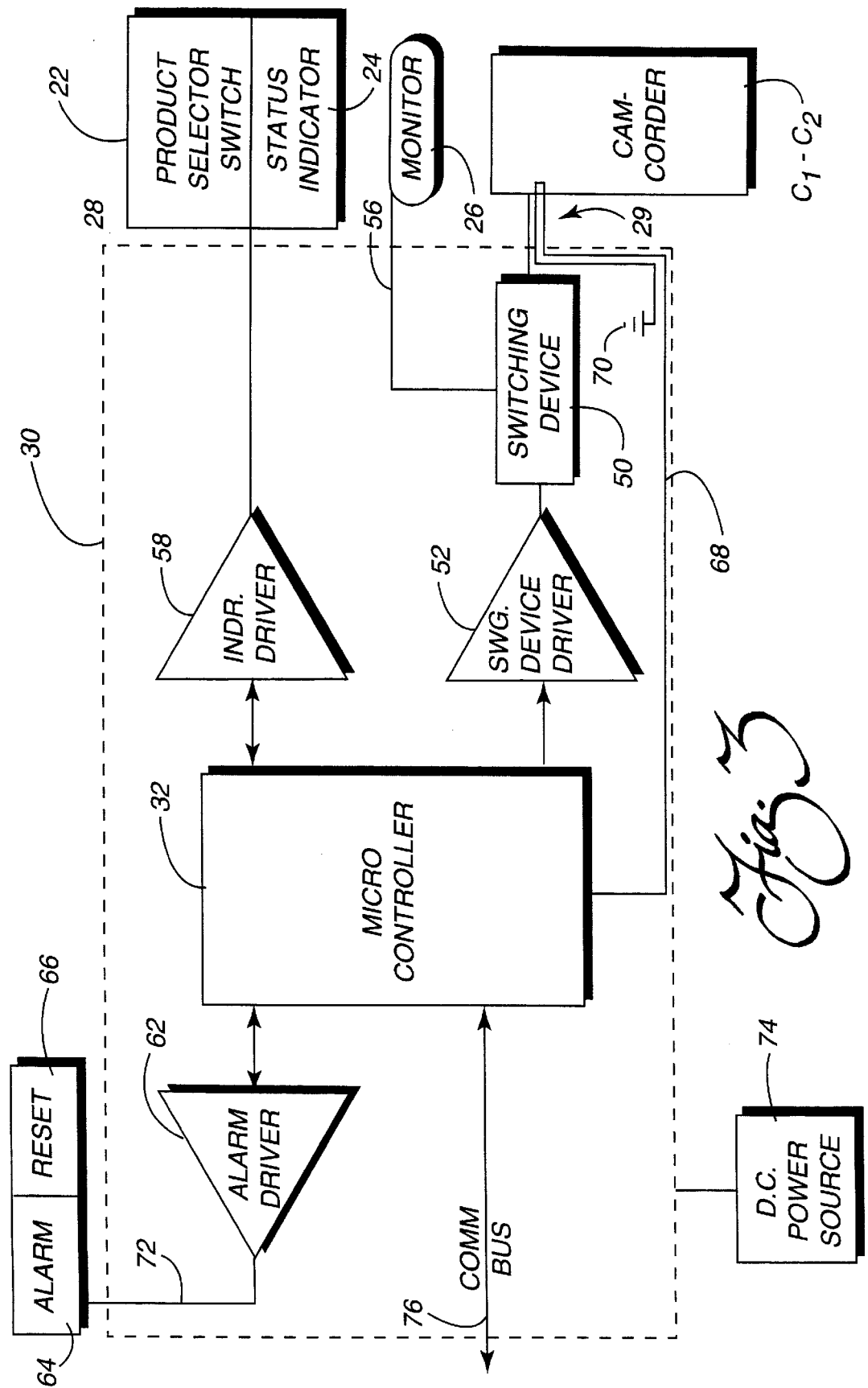
FIG. 3 is a simplified block diagram detailing a connecting means or controller.

Reference will now be made in detail to the present preferred embodiment of the invention, an example of which is illustrated in the accompanying drawing.

DETAILED DESCRIPTION OF THE INVENTION

Reference is now made to the drawing figures showing the apparatus 10 of the present invention for more efficiently and effectively displaying and demonstrating camcorders in a self-serve retail environment. The apparatus 10 of the present invention may be a stand alone system or may be a part of a switching network for selective product demonstration as set forth and described in U.S. Pat. No. 5,646,602 to Gertz et al., the full disclosure of which is incorporated herein by reference.

As shown in FIG. 1, each camcorder C is prominently displayed on a holder 12 comprising an upright cylindrical stand 14 supported on a base 16 that may be secured by a screw or other fasteners to a display fixture F.

As best shown in FIG. 1a, a pin 18 is secured to the camcorder C such as by threading into the tripod stand mounting aperture A of the camcorder. The pin 18 includes a projecting lug 20 sized for smooth sliding receipt into the top of the upright cylindrical stand 14. In this way, the camcorder C may be readily removed from the holder 12 when a customer desires to handle the camcorder to inspect and review its functions. When finished, the customer may simply replace the camcorder C back on the holder 12 by inserting the lug 20 of pin 18 into the upright cylindrical stand 14.

A momentary switch 22 in the stand 14 functions as a detector for detecting when the camcorder C is displaced or removed from the holder 12. An indicator lamp 24 may be mounted to the cylindrical stand 14 and operatively connected to the switch 22. The lamp 24 lights whenever the picture from the camcorder C is being displayed upon a monitor 26 in a manner described in greater detail below.

As best shown in FIG. 2, substantially any number of camcorders up to 100 represented as $C_1$–$C_n$ may each be positioned on its own individual holder 12 for purposes of customer display and demonstration. Each such holder 12 is equipped as described above with the momentary switch 22 and the indicator lamp 24 as shown in FIG. 1a. A pair of control wires 28 connects each momentary switch 22 to a connecting means/controller 30. Similarly, an audio/video patch cord 29 connects each camcorder $C_1$–$C_n$ to the controller 30.

As shown in FIG. 3, each controller 30 includes a microcontroller 32. The microcontroller 32 may, for example, be a type PIC16C55 unit including appropriate software support defining the logic of the controller as a whole stored in an internal program memory ROM 34 (see FIG. 4). Such a microcontroller 32 with internal read only memory integrated circuit is provided by Audio Authority Corporation Part No. 135-001 available from Audio Authority Corporation, Lexington, Ky. As best shown in FIG. 4, the microcontroller 32 includes a central processing unit or CPU 36 having a CPU control 38 to supervise operation and an arithmetic logic unit or ALU 40 for mathematical and logic functions. A system clock 42 operatively connected to the central processor unit 36 synchronizes all operations.

The microcontroller 32 also includes input and output registers 44 to send and receive data, the read only memory or ROM 34 for program storage and random access memory or RAM 46 for temporary data storage. The system clock 42, ROM 34 and RAM 46 may be physically inside or outside the microcontroller integrated circuit. An internal bus 48 allows communication between the various components of the microcontroller 32.

As best shown with reference to FIGS. 2 and 3, each controller 30 includes a switching device 50 such as a relay or other switching device known in the art. The switching device 50 is actuated by the microcontroller 32 through the switching device driver 52. The switching device 50 operatively connects the audio and video outputs of a selected camcorder C with the monitor 26 through the patch cord 29 and the signal bus 56.

The controller 30 also includes an indicator driver 58. The microcontroller 32 operates through the indicator driver 58 to control the indicator lamps 24 on the holders 12 for each camcorder. Specifically, when the camcorder C is selected for demonstration by the customer lifting it from its stand 14, the closure of switch 22 sends a signal along control wires 28 to the controller 30. In response to this signal, the microcontroller 32 acts through the indicator driver 58 to output lamp current, which flows through switch 22 while the camcorder is off the stand and switch 22 is closed, but flows through lamp or light emitting diode 24 when the camcorder is on the stand and switch 22 is open. Therefore, lamp 24 illuminates to indicate which camcorder is presently being displayed on the television monitor when all the camcorders are on their stands.

A third wire can be added to the pair of control wires 28 between camcorder stand 14 and controller 30 to operate lamp 24 independently of switch 22 in order to indicate the active camcorder regardless of whether it is on or off the stand.

Still further, the controller 30 includes an alarm driver 62 which is operatively connected to an alarm 64, such as a siren or other alarm device, and a reset switch 66. Specifically, microcontroller 32 feeds a small loop current (between approximately 1–10 milli amps) through the internal control line 68 through the patch cord 29 which loops through the camcorder C and back to ground 70. In this way the microcontroller 32 is able to monitor the continuity of the audio and video cable shield conductors of the patch cord 29. In the event the patch cord 29 is disconnected from the camcorder C or the controller 30 or the patch cord is severed, the continuity is broken and the resulting voltage increase between the audio and video jacks constituting a camcorder port is detected. This causes the microcontroller 32 to activate the alarm 64 by operation of the alarm driver 62 through the control line 72. A convenient reset switch 66 connected to the microcontroller 32 through the control line 80 may be accessed by store personnel to defeat the alarm when desired.

The controller 30 may be powered by a DC power source 74 or any other appropriate means known in the art. Further, the controller 30 may include a communication bus running from the microcontroller 32 to another like controller 30 if (1) a multiple controller system or (2) a demonstration network system such as described in issued U.S. Pat. No. 5,646,602 to Gertz et al. is being utilized.

The method of the present invention will now be described in detail. Specifically, as should be apparent from the earlier description and particularly from viewing FIG. 2, a holder 12 is provided for each camcorder $C_1$–$C_n$ on display. Each holder 12 includes a momentary switch 22 and an indicator lamp 24 as shown in FIG. 1a. Each of the switches 22 and indicator lamp 24 are connected to the controller 30 through a pair of control wires 28. When a customer removes or lifts any one of the camcorders $C_1$–$C_n$ from a holder 12, the switch 22 corresponding to that camcorder sends a signal along the control wires 28 to the controller 30. Receipt of this signal causes the microcontroller 32 to simultaneously (1) light the indicator lamp 24 at the stand 12 from which the camcorder C has been lifted through operation of the indicator driver 58 and (2) route the video or audio and video signals from the patch cord 29 of the selected camcorder through the switching device 50 and the feed line 56 to the monitor 26 by operation of the switching device driver 52. When the customer replaces the selected camcorder $C_1$–$C_n$ on the holder 12, the picture from that camcorder continues to be displayed through the monitor 26 and the associated indicator lamp 24 illuminates.

However, when the customer lifts and displaces another camcorder $C_1$–$C_n$ from a holder 12, the controller 30 receives the detection signal from the associated momentary switch 22. The microcontroller 32 then responds through the indicator driver 58 and extinguishes the previously illuminated indicator lamp 24. Simultaneously, the microcontroller 32 operates through the switching device driver 52 and the switching device 50 to disconnect the previously selected camcorder from the monitor 26 and connect the video or audio and video signals from the newly selected camcorder $C_1$–$C_n$ to the monitor. Of course, at all times, the loop current is provided through the patch cord 29 leading to each camcorder $C_1$–$C_n$ as a continuous theft deterrent. As stated above, any disconnection of the patch cord 29 from one of the camcorders $C_1$–$C_n$ results in the sounding of the alarm 64.

In summary, numerous benefits result from employing the concepts of the present invention. Advantageously, if a customer is curious enough to lift any prominently displayed camcorder $C_1$–$C_n$ from its holder 12, demonstration of the camcorder's video or audio and video signal is immediately initiated at the monitor 26 located adjacent the camcorder. Since this is done automatically without any manual switching or further effort on the part of the customer, the provided self-service demonstration is far more convenient and effective as a marketing tool. This same marketing advantage is provided each time the customer lifts another camcorder for inspection and/or demonstration thereby readily encouraging comparison and promoting a sale. No other device in the marketplace provides this "automatic" demonstration performance.

The foregoing description of a preferred embodiment of the invention has been presented for purposes of illustration and description. It is not intended to be exhaustive or to limit the invention to the precise form disclosed. Obvious modifications or variations are possible in light of the above teachings.

For example, more than one monitor 26 may be connected to a controller. Each connected monitor 26 may be associated with a small group of camcorders (e.g. 2–4) that are displayed around that monitor. When each camcorder of that subgroup is lifted, the video or audio and video signal produced by that camcorder is routed by the controller 30 to the associated monitor 26. That signal pathway is maintained until the customer selects another camcorder of that subgroup. Further, the controller 30 may be provided with logic that automatically subquentially scans through the camcorders associated with a particular monitor when none has been disturbed for a predetermined period of time. Since the controller 30 detects missing camcorders, the logic can skip over unpopulated stands 12 such as when the camcorder associated with a stand has been sold off the display.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An apparatus for displaying and demonstrating a camcorder, comprising:
   a holder for receiving and holding a camcorder;
   a display monitor for demonstrating camcorder performance;
   a detector for detecting displacement of said camcorder from said holder; and
   a controller for operatively connecting said camcorder to said display monitor upon detecting displacement of said camcorder whereby self service demonstration of said camcorder is provided as a way to promote camcorder sales.

2. The apparatus of claim 1, further including a patch cord for delivering audio and video signals from said camcorder to said controller.

3. The apparatus of claim 2, wherein said controller includes a means for generating a loop current in said patch cord and an alarm, interruption in said loop current causing said alarm to be activated.

4. An apparatus for displaying and demonstrating a camcorder, comprising:

a holder for receiving and holding a camcorder;

a display monitor for demonstrating camcorder performance;

means for detecting displacement of said camcorder from said holder; and means for operatively connecting said camcorder to said display monitor upon detecting displacement of said camcorder whereby self service demonstration of said camcorder is provided as a way to promote camcorder sales.

5. The apparatus of claim 4, further including a patch cord for delivering audio and video signals from said camcorder to said connecting means.

6. The apparatus of claim 5, wherein said connecting means includes a means for generating a loop current in said patch cord and an alarm, interruption in said loop current causing said alarm to be activated.

7. A method for displaying and demonstrating a camcorder, comprising:

providing a holder for each camcorder on display;

detecting displacement of any camcorder from any holder; and connecting any camcorder displaced from any holder to a monitor in order to demonstrate said camcorder whereby self service demonstration of said camcorder is provided as a way to promote camcorder sales.

* * * * *

UNITED STATES PATENT AND TRADEMARK OFFICE
CERTIFICATE OF CORRECTION

PATENT NO. : 6,236,435 B1  Page 1 of 1
DATED : May 22, 2001
INVENTOR(S) : Jonathan Gertz It is certified that error appears in the above-identified patent and that said Letters Patent is hereby corrected as shown below:

Column 2,
Line 48, delete "appreciate" and insert -- appreciated --.

Drawings,
Insert new Figure 3.

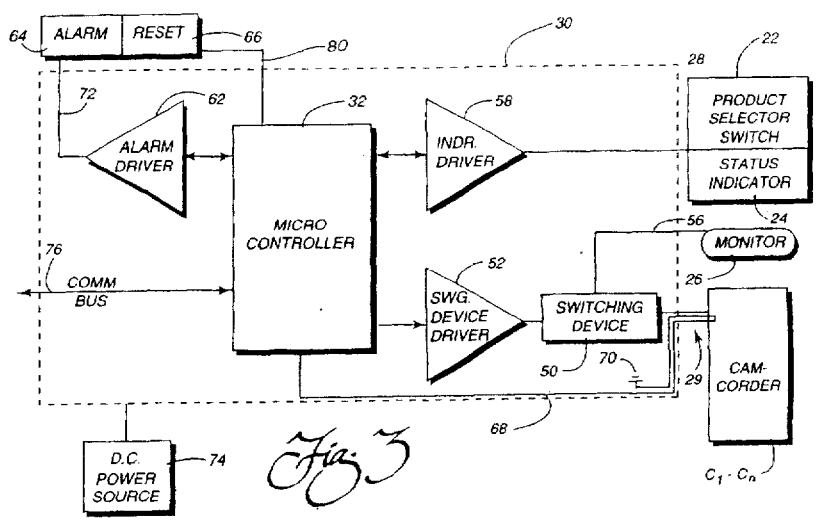

Signed and Sealed this

Ninth Day of April, 2002

Attest:

JAMES E. ROGAN
*Attesting Officer*    *Director of the United States Patent and Trademark Office*